(12) United States Patent
Chun et al.

(10) Patent No.: US 6,423,293 B1
(45) Date of Patent: Jul. 23, 2002

(54) OXYGEN STORAGE MATERIAL FOR AUTOMOTIVE CATALYSTS AND PROCESS OF USING

(75) Inventors: Woosang Chun, Plymouth; George Wade Graham, Ann Arbor; Robert Walter McCabe, Lathrup Village, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 878 days.

(21) Appl. No.: 08/711,631

(22) Filed: Sep. 6, 1996

(51) Int. Cl.$^7$ .................... C01B 13/00; B01J 23/10
(52) U.S. Cl. .................. 423/579; 423/263; 502/302; 502/304; 502/349
(58) Field of Search .................... 502/302, 304, 502/349; 423/579, 263

(56) References Cited

U.S. PATENT DOCUMENTS

| | | | | |
|---|---|---|---|---|
| 3,980,763 A | * | 9/1976 | Mullhaupt et al. | 423/579 |
| 4,492,769 A | * | 1/1985 | Blanchard et al. | 502/262 |
| 4,857,296 A | * | 8/1989 | Brunelle et al. | 423/574 R |
| 5,010,052 A | * | 4/1991 | Quemere | 502/304 |
| 5,071,816 A | * | 12/1991 | Horiuchi et al. | 502/304 |
| 5,478,543 A | * | 12/1995 | Murota et al. | 423/263 |
| 5,571,492 A | * | 11/1996 | Yao et al. | 423/263 |

FOREIGN PATENT DOCUMENTS

EP    0 611 192    2/1994

* cited by examiner

*Primary Examiner*—Nadine Preisch
(74) *Attorney, Agent, or Firm*—Damian Porcari

(57) ABSTRACT

The invention is a mixed oxide oxygen storage material useful as a catalyst or catalyst washcoat. The mixed oxide is praseodymium oxide loaded onto a support of either cerium oxide or cerium-zirconium oxide. The praseodymium oxide is loaded on the support so that the resultant mixed oxide contains praseodymium and cerium in a molar ratio of 1:4 to 4:1. This mixed oxide may be loaded with a catalyst like palladium for use in automotive exhaust gas systems.

15 Claims, 1 Drawing Sheet

OXYGEN STORAGE MATERIAL FOR AUTOMOTIVE CATALYSTS AND PROCESS OF USING

TECHNICAL FIELD

This invention relates to praseodymium oxide loaded on a high surface area cerium oxide or cerium-zirconium oxide useful as catalysts or catalysts supports.

BACKGROUND OF THE INVENTION

Materials which can alternately take up and release oxygen, i.e., provide oxygen storage, are useful in a number of applications including selective oxidation and oxidative dehydrogenation of organic compounds, separation of oxygen from air, and cryogenic refrigeration. Oxides of lanthanide elements which have variable oxidation states, cerium (Ce), praseodymium (Pr), and terbium (Tb), are particularly useful for such catalyst since changes in oxidation state, and thus oxygen content, are relatively easily effected. The increase of atomic number in the sequence Ce—Pr—Tb is accompanied by a corresponding decrease of the stability of $MO_2$ (M=Ce, Pr, Tb) oxides, which in turn reduces the temperature at which oxygen can become available. Thus, in this regard, praseodymium oxide can be considered to be a superior oxygen storage material as compared to cerium oxide.

Cerium oxide, supported on high-surface area alumina at a loading of up to 20 wt %, has long been employed in commercial automotive three-way catalysts primarily as an oxygen storage material. Despite the fact that praseodymium oxide is able to provide oxygen at a lower temperature, praseodymium oxide has not been commercially used in place of the cerium oxide on the alumina. This is due to the fact that praseodymium oxide reacts with the alumina at relatively low temperatures (600° C.), forming an aluminate which is ineffective for oxygen storage.

Recently, new automotive catalyst formulations have been developed in which cerium is deployed as part of a mixed oxide, primarily with zirconium, for use as a high surface area catalyst or as a support for a catalyst like platinum. These mixed oxides, e.g., of cerium oxide and zirconium oxide, can be formed by techniques such as mechanical mixing, coprecipitation, or sol-gel processing. The latter is disclosed in EPO patent application 0611192, published Aug. 17, 1994, which teaches forming cerium zirconium mixed oxides from a mixture of a zirconium sol and a cerium sol. A small amount of dopant such as silicon or praseodymium is suggested for inclusion into the sol mixture to act as a stabilizer for the mixed oxides product. As such, the amount of praseodymium oxide is too small to contribute much to the actual oxygen storage capacity. In U.S. patent application Ser. No. 08/650,244 filed May 20, 1996, now abandoned, commonly assigned with the present invention and having a common inventor, a sol-gel process is disclosed for making a high surface area praseodymium-zirconium-oxide useful as a catalyst and a washcoat.

Although the precise role of zirconium in such mixed oxides is poorly understood, it is generally thought that it serves to both promote the oxygen storage function of cerium oxide and provide thermal stability to the mixed oxide so that it retains it high surface area. Compared with cerium oxide having a thermally stable high surface area, the cerium-zirconium oxide provides superior oxygen storage capacity.

Both of these cited application processes involves using complex sol-gel techniques. It would be desirable to use a less complex method of making a mixed oxides having high surface area and excellent oxygen storage properties. The present invention fulfills such requirements.

DISCLOSURE OF THE INVENTION

The invention is a mixed oxide oxygen storage material consisting essentially of praseodymium oxide loaded onto a high surface area (i) cerium oxide or (ii) cerium-zirconium oxide, the molar ratio of praseodymium to cerium in the mixed oxide being 1:4 to 4:1. Loading of either material with praseodymium oxide may be performed by, for example, standard incipient wetness techniques. The resultant mixed oxide may be used as a catalyst or a catalyst support. In the latter instance, a catalyst material such as a noble metal may be loaded on these mixed oxides. The present invention mixed oxide is thermally stable and maintains a high-surface-area at elevated temperatures as may be experienced in automotive exhaust gas systems.

According to still another embodiment, it is a method for treating automotive internal combustion engine exhaust gases by exposing the exhaust gases to the invention mixed oxides disclosed above, wherein the mixed oxides may be loaded with a catalyst material like palladium.

The above-mentioned interaction problems between praseodymium oxide and alumina can be avoided if the praseodymium oxide is loaded instead on cerium oxide or cerium-zirconium-oxide rather than on alumina. The oxygen storage capacity of the praseodymium oxide loaded onto cerium-zirconium oxide material increases significantly, generally by a factor of 2–5, as compared to the cerium-zirconium-oxide itself. Unexpectedly, we found that there is a synergistic enhancement of oxygen storage capacity in our new praseodymium-cerium-zirconium oxide over that of the sum of praseodymium oxide and cerium-zirconium oxide. And, praseodymium oxide loaded onto a high surface area cerium-zirconium oxide was found to be thermally stable and able to maintain its high surface area at elevated temperatures. Furthermore, praseodymium oxide when supported on high-surface-area cerium oxide likewise provides a new oxygen storage material with thermal stability and oxygen storage capacity which is comparable to that for praseodymium oxide supported on cerium-zirconium oxide. Hence, the present invention thermally stable, high-surface area mixed oxides allow praseodymium oxide to be deployed as a catalyst or catalyst support in which its superiority over purely cerium-based oxides as oxygen storage materials is maintained. The increase in oxygen storage capacity of the mixed oxides believed attributable to the praseodymium oxide is found to be especially enhanced by high-temperature treatment of the mixed oxide as might be experienced in an automotive exhaust gas system.

DESCRIPTION OF BEST MODE OF THE INVENTION

Figure 1A:
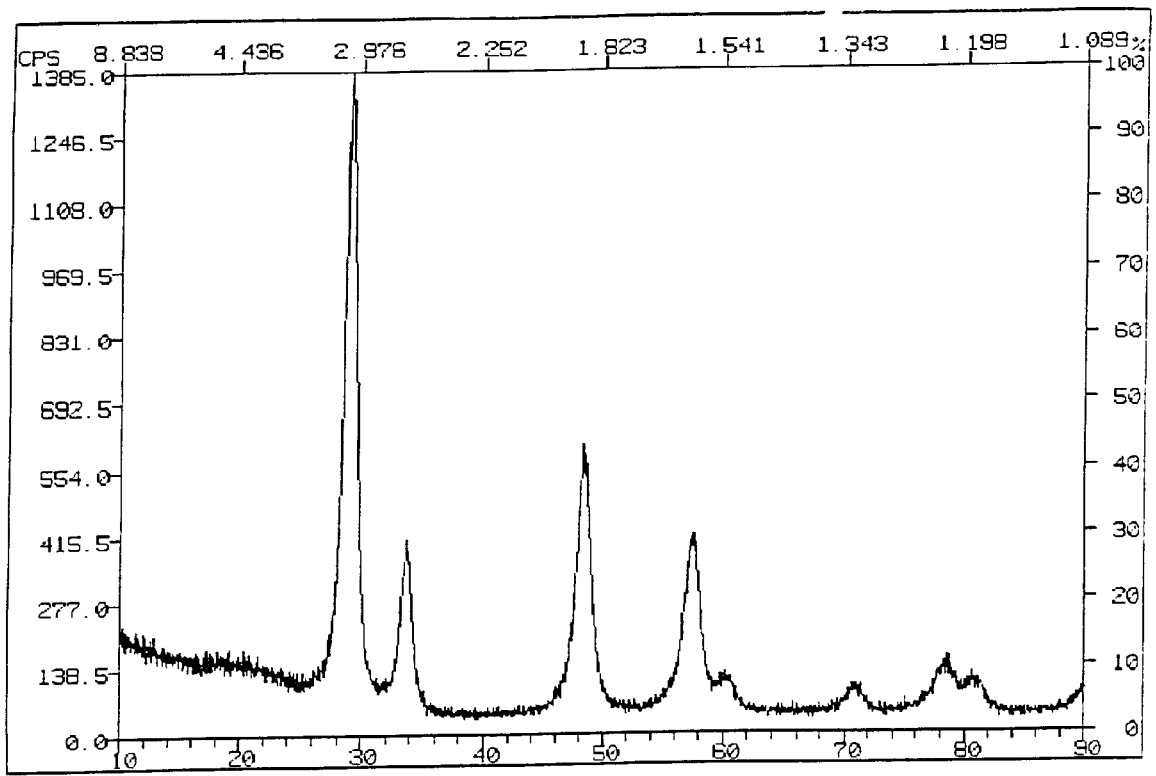
FIGS. 1a and 1b are powder x-ray diffraction patterns, respectively, of the starting material and final mixed oxide oxygen storage material according to an embodiment of the present invention (Example 1).

The invention is a mixed oxide made by loading praseodymium oxide onto a high surface area (i) cerium oxide or (ii)cerium-zirconium oxide. In this mixed oxide, the molar ratio of the praseodymium to cerium is between 1:4 and 4:1, preferably being between 1:2 and 2:1, and most preferably being about 1:1. The optimal ratio is dependent on such factors as specific surface of the starting material and the method of loading as would be apparent to those skilled in the art in view of the present disclosure.

High surface area cerium oxide or cerium-zirconium oxide materials are well known to those skilled in the art and are commercially available as from Rhone-Pouletie chemic or Magnesium Electron Limited. Generally, by "high surface area" as used in this invention is meant that the cerium oxide or zirconium-zirconium oxide preferably has a specific surface area between about 10 and 100 $m^2/g$ (BET). As is known in the art, a high surface area allows optimal contact between the mixed oxide and the fluids to be catalyzed by the mixed oxide or any catalyst carried thereon. This cerium oxide or cerium-zirconium oxide used to support the praseodymium oxide may be in powder form or a perform shape. The ratio of cerium oxide to zirconium oxide in the cerium-zirconium oxide support material can vary widely and selection of the optimal ratio would be dependent on such factors as temperature range of application and precious metal as would be apparent to those skilled in the art in view of the present disclosure. Preferably, the ratio of cerium to zirconium in such high surface area oxide as useful in this invention is between about 1:0 to 1:20.

The praseodymium oxide may be loaded onto the support (high surface area cerium oxide or cerium-zirconium oxide) by any technique. One way is by incipient wetness from a solution of a soluble praseodymium salt. For example, the solution can be an aqueous praseodymium nitrate solution. Generally, according to such techniques, a powder of the cerium oxide or cerium-zirconium oxide would be mixed with water which includes a soluble salt of praseodymium dissolved therein. Exemplary of such salts are nitrates and acetates of praseodymium. The mixture is then generally dried to remove the water and then heated to an elevated temperature sufficient to calcine the loaded support and form the mixed oxides of the present invention. Generally, calcining temperatures are at least about 450° C., and calcining is carried out optimally for at least about 120 minutes, more preferably between about 1 and 4 hours. Calcining is also useful to prepare the material for subsequent processing steps such as loading with precious metals.

The mixed oxides of the invention can be formed into configurations to be used as catalysts themselves. In addition, these oxides can be used as supports (washcoats) to be loaded with catalytic materials like precious metals such as platinum, palladium, rhodium or mixtures thereof. These latter metals are commonly used as three-way catalysts for treating carbon monoxide, hydrocarbons and nitrogen oxides present in internal combustion engine exhaust gases. Other catalysts can also be loaded on the mixed oxide to make it effective to treat automotive gases as will be apparent to those skilled in the art in view of the present disclosure. Still other uses for these oxides include, but are not limited to, nitric acid decomposition, treatment of flue gases and oxidative dehydrogenation. These materials have the advantage that they provide lattice oxygen for catalytic oxidation.

If the mixed oxide product is used as a washcoat to carry other catalytic materials such a palladium or platinum, it may be loaded with these materials in any known way. One common way is by loading of a catalytic material like platinum from a solution of its soluble salt, e.g., a nitrate or chloride using incipient wetness techniques. After the platinum is impregnated into the mixed oxide or a slurry is formed therewith, it is generally subjected to drying and calcining.

For use in an exhaust gas system, for example, it may be applied onto substrates like ceramic or metallic honeycomb or cordierite monoliths. This would optimally be done from a slurry of the mixed oxide carrying the catalyst. Alternately, the mixed oxide may be washcoated onto the honeycomb and then the mixed oxide on the honeycomb impregnated with the catalyst. The same alternatives are possible in providing the mixed oxide to a substrate, e.g., a honeycomb. That is, the support (e.g., cerium oxide) for the praseodymium oxide may be first applied as a washcoat to the honeycomb or monolith and then loaded with the praseodymium oxide by means of incipient wetness. It is most desirable, however, to load the praseodymium oxide on the high surface area support (cerium or cerium/zirconium oxide) first and then apply the resultant mixed oxide to the honeycomb or monolith. For use in automotive vehicle exhaust, such a loaded substrate would then be placed in the vehicle catalytic converter, which during use, is subjected to exhaust gases.

EXAMPLE 1

In this example, a support material of cerium-zirconium oxide was impregnated with praseodymium oxide according to an embodiment of this invention. A commercial performed single-phase cerium-zirconium oxide having the approximate composition $Ce_{0.7}Zr_{0.3}O_2$ was loaded with praseodymium oxide using incipient wetness techniques from an aqueous solution of praseodymium nitrate. The loading procedure was as follows: dissolve a stoichiometric amount of PR $(NO_3)_3.6H_2O$ in distilled water to give a ratio of Pr: cE=1:1 by weight in the final product (for example, 1.17 g of praseodymium nitrate for 1 g of cerium-zirconium oxide sample which contains 0.378 g Ce). Slowly add the cerium-zirconium oxide to the solution and mix thoroughly. Dry the slurry on a hot plate with constant stirring. Pulverize the product after complete drying.

The concentration of the nitrate was such that the cerium and praseodymium concentrations in the resulting mixed oxide were the same. The specific surface area (using the BET method) of this support loaded with praseodymium oxide after calcination at 600° C. and 1000° C. for 4 hours is listed in Table 1 (listed as "w Pr"). Also listed in Table 1, for comparison is the specific surface area of the cerium-zirconium oxide support itself (listed as w/o Pr) after calcination at 600° C., 800° C. and 1000° C. for 4 hours at each temperature and not being according to the present invention.

TABLE 1

|  | surface area ($m^2/g$) | | Z (600° C.) – Z (200° C.) | |
| --- | --- | --- | --- | --- |
|  | w/o Pr | w Pr | w/o Pr | w Pr |
| 600° C. | 102 | 85 | 0.040 | 0.075 |
| 800° C. | 63 |  | 0.025 |  |
| 1000° C. | 23 | 21 | 0.006 | 0.035 |

The amount of reversibly exchangeable oxygen, measured by thermogravimetry in air between 600° C. and 200° C., expressed in "Z", defined by $Ce_aPr_bZr_cO_{2-z}$, is also listed in Table 1 for both the present invention mixed oxides (w Pr) and comparative examples of the support itself (w/o Pr) after calcination. From this table, it can be seen that the oxygen storage capacity of the initial material was increased by a factor of about 2–6, depending on calcination temperature, by loading it with praseodymium oxide. Unexpectedly, the increase exceeds that attributable to pure praseodymium oxide alone, which would be about 0.02. Further, the table shows that the final material (w Pr), according to the present invention, maintains high specific surface area over the full range of calcination temperature.

Figure 1B:
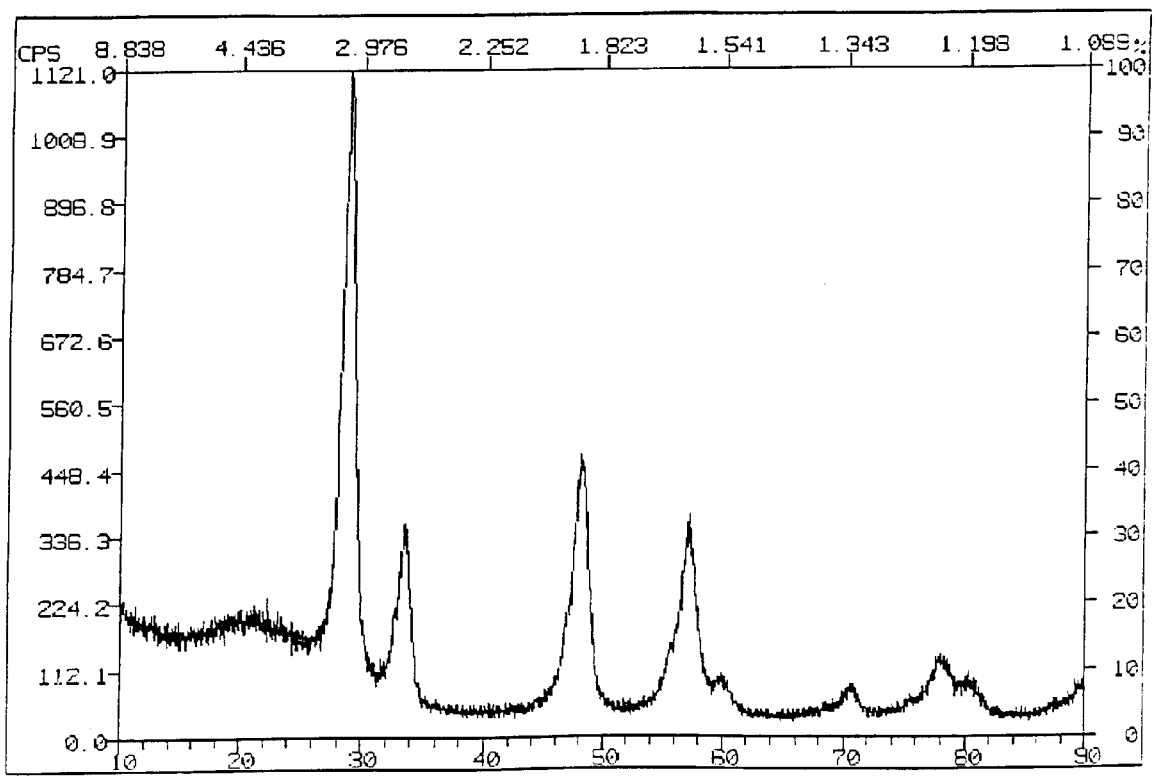

FIGS. 1a and 1b are powder x-ray diffraction patterns from support and the present invention mixed oxide material, respectively in Example 1 following calcination at 600° C. The pattern in FIG. 1b shows weak shoulders on some of the lines of the pattern in FIG. 1a which are at the positions of $Pr_6O_{11}$, but most of the added praseodymium oxide is invisible. This teaches that the mixed oxide material according to the present invention is not merely a mixture of the initial oxide support material and pure praseodymium oxide.

EXAMPLE 2

This is an example according to an embodiment of the present invention. A commercial performed cerium oxide was loaded with praseodymium oxide using an aqueous solution of praseodymium nitrate in such a way that the cerium and praseodymium concentrations in the resulting mixed oxide were the same. The process parameters were the same as in Example 1. The specific surface area of this mixed oxide after calcination at 600° C. and 1000° C. for 4 hours is listed in Table 2 below. Also listed in Table 2, for comparison, is the specific surface area of the cerium oxide support (w/o Pr) after calcination at 600° C., 800° C. and 1000° C. for 4 hours.

TABLE 2

|  | surface area (m²/g) | | z (600° C.) – Z (200° C.) | |
| --- | --- | --- | --- | --- |
|  | w/o Pr | w Pr | w/o Pr | w Pr |
| 600° C. | 190 | 130 | 0.045 | 0.090 |
| 800° C. | 74 |  | 0.015 |  |
| 1000° C. | 42 | 9 | 0.005 | 0.060 |

The amount of reversibly exchangeable oxygen, measured by thermogravimetry, in air, between 600° C. and 200° C. expressed in "Z", defined by $Ce_aPr_bO_{2-z}$, at a temperature of 600° C., is also listed in Table 2 for both the present invention mixed oxide (i.e., w Pr) and the comparison example (w/o Pr) after calcination. It can thus be seen that the oxygen storage capacity of the initial material was increased by a factor of 2–12, depending on calcination temperature, by loading it not praseodymium oxide. Again, unexpectedly, the increase exceeds that attributable to pure praseodymium oxide alone, which would be about 0.025.

EXAMPLE 3

To make another present invention mixed oxide embodiment, a commercial performed high surface area cerium oxide is impregnated with praseodymium oxide using an aqueous solution of praseodymium acetate in such a way that the cerium and praseodymium concentrations in the resulting mixed oxide are in the ratio of cerium to praseodymium of 2 to 1.

We claim:

1. A mixed oxide oxygen storage material useful as a catalyst or catalyst washcoat, said mixed oxide consisting essentially of praseodymium oxide loaded onto a high surface area support material of (i) cerium oxide or (ii) cerium-zirconium oxide, wherein said molar ratio of praseodymium to cerium in said mixed oxide is 1:4 to 4:1.

2. The mixed oxide according to claim 1 wherein at said ratio of said praseodymium to cerium in said mixed oxide is about 1:2 to 2:1.

3. The mixed oxide according to claim 2 wherein at said ratio of praseodymium to cerium in said mixed oxide is about 1:1.

4. The mixed oxide according to claim 1 wherein the molar ratio of cerium to zirconium of said support material is 1:0 to 1:20.

5. The mixed oxide according to claim 1 wherein said praseodymium oxide is loaded onto said high surface area support material from an aqueous solution of a soluble salt of praseodymium.

6. The mixed oxide according to claim 5 wherein said soluble salt of praseodymium is selected from nitrates and acetates.

7. A method for making a mixed oxide oxygen storage material consisting essentially of praseodymium oxide loaded onto a high surface area support material of (i) cerium oxide or (ii) cerium-zirconium oxide, said method comprising the steps of:

providing a high surface area support material of (i) cerium oxide or (ii) cerium-zirconium oxide, loading praseodymium oxide onto said support material to form a mixed oxide having a molar ratio of praseodymium to cerium of 1:4 to 4:1.

8. The method according to claim 7 wherein said loading step comprises loading said praseodymium oxide to form a mixed oxide having a molar ratio of praseodymium to cerium of about 1:2 to 2:1.

9. The method according to claim 8 wherein said ratio of praseodymium to cerium in said mixed oxide is about 1:1.

10. The method according to claim 7 wherein the molar ratio of cerium to zirconium of said support material is 1:0 to 1:20.

11. The method according to claim 7 wherein said praseodymium oxide is loaded onto said high surface area support material from an aqueous solution of a soluble salt of praseodymium.

12. The method according to claim 11 wherein said soluble salt of praseodymium is selected from nitrates and acetates.

13. A method of treating the components of automotive exhaust gas, which method comprises:

providing a mixed oxide oxygen storage material useful as a catalyst or catalyst washcoat in and automotive exhaust gas system, said mixed oxide consisting essentially of praseodymium oxide loaded onto a high surface area support material of (i) cerium oxide or (ii) cerium-zirconium oxide, wherein said molar ration of praseodymium to cerium in said mixed oxide is 1:4 to 4:1, and exposing said exhaust gas to said mixed oxides to treat said exhaust gas.

14. The method according to claim 13 which further includes providing a catalyst onto said mixed oxides.

15. The method according to claim 14, wherein said catalyst is selected from platinum, palladium, rhodium, and mixtures thereof.

* * * * *